United States Patent [19]

Hideaki et al.

[11] Patent Number: 4,794,514
[45] Date of Patent: Dec. 27, 1988

[54] NC PROGRAM EDITING METHOD FOR FOUR-AXIS LATHES

[75] Inventors: Kawamura Hideaki; Teruyuki Matsumura; Takashi Iwagaya; Takahiko Mineshige, all of Hachioji, Japan

[73] Assignee: Fanuc Ltd., Minamitsuru, Japan

[21] Appl. No.: 2,397

[22] PCT Filed: May 17, 1986

[86] PCT No.: PCT/JP86/00254
§ 371 Date: Dec. 15, 1986
§ 102(e) Date: Dec. 15, 1986

[87] PCT Pub. No.: WO86/06997
PCT Pub. Date: Dec. 4, 1986

[30] Foreign Application Priority Data

May 18, 1985 [JP] Japan ................... 60-106450

[51] Int. Cl.$^4$ .................. G06F 15/46; G05B 19/18
[52] U.S. Cl. .................. 364/474.22; 82/2 B; 318/568; 364/192; 364/474.21

[58] Field of Search ........... 364/474, 475, 167–171, 364/191–193; 82/2 B, 3, 12, 14 E, 25, 36 R, 36 A; 318/568, 625

[56] References Cited

U.S. PATENT DOCUMENTS

| | | | |
|---|---|---|---|
| 4,092,720 | 5/1978 | Carey | 364/474 |
| 4,558,419 | 12/1985 | Kanematsu et al. | 364/475 X |
| 4,571,670 | 2/1986 | Kishi et al. | 364/171 |
| 4,586,125 | 4/1986 | Takagawa | 364/171 X |
| 4,680,719 | 7/1987 | Kishi et al. | 364/474 |

Primary Examiner—Joseph Ruggiero
Attorney, Agent, or Firm—Staas & Halsey

[57] ABSTRACT

The present invention provides a method of editing NC programs for a four-axis lathe for creating NC programs that make possible simultaneous machinining by two tool rests. In order to raise machining efficiency, the machining speed is adjusted between the NC programs edited for each tool rest or an adjustment is performed by altering machining sequences or by resetting them in such a manner that the machining sequences are executed simultaneously. This facilitates modification of machining speed, resetting of machining sequence, etc.

3 Claims, 6 Drawing Sheets

Fig. 1

| NO. | TOOL REST 1 | TOOL REST 2 | ROTATIONAL SPEED |
|---|---|---|---|
| 1 | DRILLING | | G97 N 1000 (TOOL REST 1) |
| 2 | | OUTER DIAMETER ROUGH CUTTING | G96 V 120 (TOOL REST 2) |
| 3 | INNER DIAMETER ROUGH CUTTING | | G96 V 140 (TOOL REST 1) |
| 4 | | OUTER DIAMETER FINISHING | G96 V 115 (TOOL REST 2) |
| 5 | INNER DIAMETER FINISHING | | G96 V 225 (TOOL REST 1) |
| 6 | | GROOVE CUTTING | G96 V 110 (TOOL REST 2) |
| 7 | | THREAD CUTTING | G97 V 100 (TOOL REST 2) |
| 8 | THREAD CUTTING | | G97 V 120 (TOOL REST 1) |

V(N) = __

CURSOR (pointing to NO. 1)

DISCONTINUE · CUTTER 1 UP · CUTTER 1 DOWN · CUTTER 2 up · CUTTER 2 DOWN · SELECT S CODE · RETURN CURSOR · ADVANCE CURSOR · NEXT PAGE

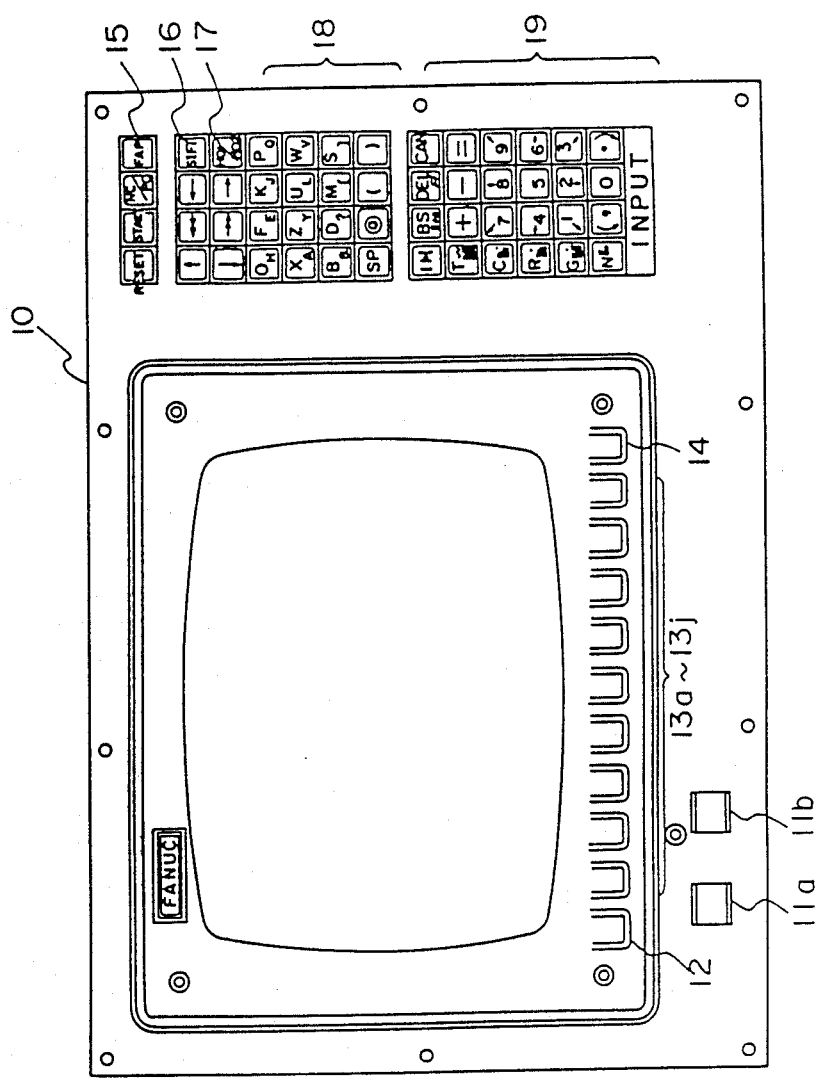

Fig. 3
PRIOR ART

| PROCESS NO. | PROCESS TYPE | TOOL REST NO. |
|---|---|---|
| 1 | DRILLING | 1 |
| 2 | OUTER DIAMETER ROUGH CUTTING | 2 |
| 3 | INNER DIAMETER ROUGH CUTTING | 1 |
| 4 | OUTER DIAMETER FINISHING | 2 |
| 5 | INNER DIAMETER FINISHING | 1 |
| 6 | GROOVE CUTTING (OUTER DIAMETER) | 2 |
| 7 | THREAD CUTTING (OUTER DIAMETER) | 2 |
| 8 | THREAD CUTTING (INNER DIAMETER) | 1 |

Fig. 4

| NO. | TOOL REST 1 | TOOL REST 2 | ROTATIONAL SPEED |
|---|---|---|---|
| 1 | DRILLING | | G97 N 1000 (TOOL REST 1) |
| 2 | | | |
| 3 | INNER DIAMETER ROUGH CUTTING | OUTER DIAMETER ROUGH CUTTING | G96 V 120 (TOOL REST 1) |
| 4 | | OUTER DIAMETER FINISHING | G96 V 115 (TOOL REST 2) |
| 5 | INNER DIAMETER FINISHING | | G96 V 225 (TOOL REST 1) |
| 6 | | GROOVE CUTTING | G96 V 125 (TOOL REST 2) |
| 7 | | | |
| 8 | THREAD CUTTING | THREAD CUTTING | G97 V 120 (TOOL REST 1) |

V(N) = __

Buttons: DISCONTINUE, CUTTER 1 UP, CUTTER 1 DOWN, CUTTER 2 UP, CUTTER 2 DOWN, SELECT S CODE, RETURN CURSOR, ADVANCE CURSOR, NEXT PAGE

NC PROGRAM EDITING METHOD FOR FOUR-AXIS LATHES

BACKGROUND OF THE INVENTION

This invention relates to an NC program editing method for efficiently creating NC programs of a four-axis lathe having two tool rests by a CNC (computer-controlled numerical control unit) for lathes.

BACKGROUND ART

An NC for controlling a four-axis lathe is applied to lathes having four independent drive shafts for operating two tools rests independently so that turning work can be performed simultaneously by the two tool rests. The NC can be applied to a lathe of this type in which a single workpiece is secured to a single spindle for being machined by the two tool rests simultaneously, or to a lathe of this type in which two workpieces are respectively secured to two spindles for being machined by respective tool rests.

Frequently, in order to edit the NC program for such a four-axis lathe, the program once created is temporarily registered in a memory and the program is then modified by using an MDI (manual data input) unit and a CRT (display unit). FIG. 2 illustrates an example of an MDI/CRT panel 10 used when a program is edited in this manner. In the FIGURE, a menu picture on a CRT character display turned on and off by a power on button 11a and power off button 11b has a next key 12 for advancing the page of the display, ten soft keys 13a–13j, and a return key 14 for turning back a page. Provided at the side of the screen is an MDI comprising a mode selection key 15, a shift key 16, a tool rest selection key 17, data input keys 18 and symbolic keys 19.

Conventionally, to modify an NC program using an MDI/CRT 10 of this type, first a menu reading "Machining Definition", which decides the machining sequence and type of machining, is taken from a buffer and displayed on the CRT. For example, by utilizing a soft key designating "Correction", a machining display of the step requiring modification is selected and NC data are inputted anew.

In order to raise machining efficiency when creating NC programs that make it possible to perform machining simultaneously by two tool rests, it is necessary to adjust the machining speed between the NC programs edited for each tool rest or to effect an adjustment by resetting peripheral speed, which is defined by the menu "Machining Definition", in such a manner that the machining sequences are altered or executed simultaneously. However, to effect program editing by utilizing the menu "Machining Definition" in the prior art, considerable skill is required and it is difficult for a beginner to perform program editing efficiently.

The present invention has been devised in view of the foregoing points and its object is to provide an NC program editing method for a four-axis lathe in which modification of machining speed, resetting of machining sequence and the like can be performed with ease by using the soft key functions of an MDI/CRT.

SUMMARY OF THE INVENTION

The present invention provides a method of editing NC programs of a four-axis lathe having two tool rests. The method includes a machining definition step of defining machining processes by deciding a machining sequence and a type of machining for each tool rest, a process display step of displaying a defined process together with predetermined NC data classified by tool rest, a step of resetting machining sequences of machining types capable of being performed simultaneously by both tool rests, and a step of modifying machining speed in said machining definition. A menu "NC Data Creation" is displayed after the menu "Machining Definition", a machining process which has already been defined is displayed, classified by tool rest, on the initial picture reading "NC Data Creation", editing of an S (spindle function) code, editing of processes and the like are performed on the display screen, and an M (miscellaneous function) code for each tool rest is outputted, thereby creating two NC programs conforming to the edited processes.

BRIEF DESCRIPTION OF THE DRAWINGS

FIG. 1 is a view for describing a menu illustrating an embodiment of the method of the present invention, FIG. 2 is a view illustrating an example of an MDI/CRT panel, FIG. 3 is a view for describing a menu illustrative of the prior-art method, FIG. 4 is an explanatory view illustrating an example of an edited menu.

DESCRIPTION OF THE PREFERRED EMBODIMENTS

Figure 5:
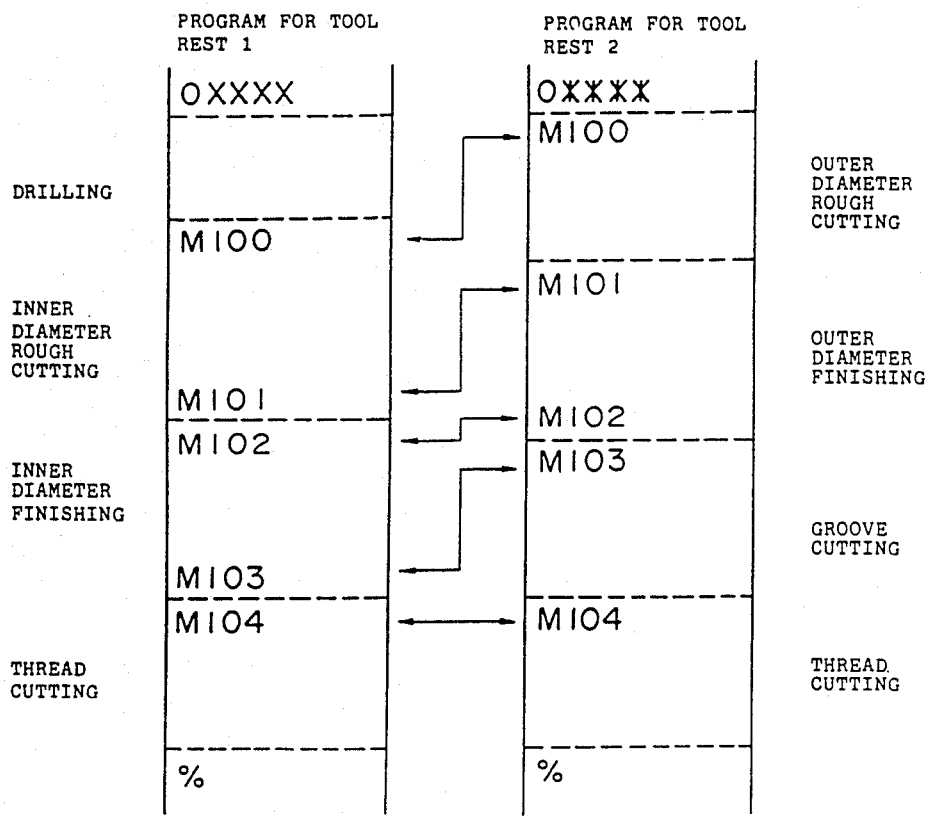
FIG. 5 is a view showing the correspondence between two programs.

The present invention will now be described in detail on the basis of an embodiment thereof.

With a numerical control unit having a conversational-type automatic programming function, a program is created and edited by inputting a conversational picture, in which NC data necessary for machining are divided into a plurality of main items, while being called by a display device such as the MDI/CRT. For example, FIG. 3 shows a process display defined in "Machinin Definition" of Menu No. 4.

Specifically, a process for machining a specific workpiece is as follows, where the machining steps are shown in order:

1. perform drilling with the tool of tool rest 1;
2. perform outer diameter rough cutting with the tool of tool rest 2;
3. perform inner diameter rough cutting with the tool of tool rest 1;
4. perform outer diameter finishing with the tool of tool rest 2;
5. perform inner diameter finishing with the tool of tool rest 1;
6. perform outer diameter grooving with the tool of tool rest 2;
7. perform outer diameter thread cutting with the tool of tool rest 2; and
8. perform inner diameter thread cutting with the tool of tool rest 1. When such machining definition is carried out, a process chart of the type shown in FIG. 1 is displayed on the initial picture of "NC Data Creation" of Menu No. 5.

Nos. 1 through 8 in FIG. 1 are process numbers on the right side of which are displayed the machining processes of tool rests 1 and 2, respectively, as well as the rotational speed of each tool rest. N in the rotational speed column represents spindle speed, and V represents cutting velocity.

Illustrated at the bottom of the CRT picture of FIG. 1 are key names corresponding to the soft keys 13a–13j shown in FIG. 2. The meanings of these key means are as follows:

DISCONTINUE: discontinue processing of this picture;
CUTTER 1 UP: raise, by one rank, process of tool rest 1 at currently indicated position of cursor;
CUTTER 1 DOWN: lower, by one rank, process of tool rest 1 at currently indicated position of cursor;
CUTTER 2 UP: raise, by one rank, process of tool rest 2 at currently indicated position of cursor;
CUTTER 2 DOWN: lower, by one rank, process of tool rest 2 at currently indicated position of cursor;
SELECT S CODE: select S code of whichever tool rest has priority when performing simultaneous operation;
RETURN CURSOR: move cursor position back;
ADVANCE CURSOR: move cursor position ahead; and
NEXT PAGE: move to next picture (a picture calling for the program number)

In FIG. 1, the cursor at Process No. 1 is aligned with Process No. 2 by pressing CURSOR ADVANCE, the soft key CUTTER 2 DOWN is pressed, the cursor is then aligned with 7 and the soft key CUTTER 2 DOWN is pressed, thereby enabling operation in which outer diameter rough cutting, inner diameter rough cutting and the thread cutting performed by the tools of tool rests 1, 2 are executed simultaneously.

If the cursor is aligned with Process No. 6 and e.g. "125" is inputted in response to a prompt "V(N)=", then the cutting velocity for groove cutting will be modified from 110 mm/min to 125 mm/min.

Thus, the process chart of FIG. 1 is edited in such a manner that simultaneous operation using both tool rests is carried out. In addition, the relative velocity between a cutter and a workpiece can be redesignated separately of what has been set using the picture "Machining Definition". FIG. 4 illustrates an example of an edited process chart. An S code for a case where simultaneous operation is performed is outputted as picture information only for a process on the side of tool rest 1 or on the side of tool rest 2. Accordingly, at which peripheral speed machining is to be carried out can be decided by looking at the rotational speeds displayed on the display screen.

In other words, whenever the soft key SELECT S-CODE is pressed, the values of tool rests 1 and 2 are alternately displayed on the screen. By aligning the cursor with the prescribed Process No. and operating the soft keys, NC data will be created in a state where the peripheral speed to be outputted is displayed. In the figure, the state illustrated is one in which the rotational speed of Process No. 3 is modified from "G96V140 (tool rest 1)" to "G96V120 (tool rest 2)". When NC data are created in this state, data "G96 S . . . " are outputted in the outer diameter rough cutting process of tool rest 2. However, these data are not outputted in the inner diameter rough cutting process performed simultaneously by tool rest 1.

Thus, by using the soft keys, the process of the displayed picture is moved up and down and the machining sequences of types of machining that can be performed simultaneously by both tool rests can be reset. Further, cutting velocity can be modified by setting rotational speed in response to a prompt on the display screen. In simultaneous operation, which S code is to take precedence can be specified by the soft keys. The display on the screen shows the spindle rotational speed N for drilling and center boring and the cutting velocity V for all other types of machining.

FIG. 5 shows two NC programs created in accordance with edited processes by automatically outputting an M (miscellaneous) code for each tool rest after S code editing and process editing are performed.

The M code is outputted as an NC program in accordance with the following criteria:

(1) An M code is not outputted when the current process and next process are executed by the same tool rest.
(2) The same M code is outputted to the end portion of the current process and to the beginning portion of the next process when the current process and next process are executed by different tool rests.
(3) The same M code is outputted to the beginning portions of both processes in case of simultaneous operation by both tool rests.

In a case where "Machining Definition" of Menu No. 4 is selected again and a correction is performed in order to add a new process afresh after editing of a process has ended or to correct a portion of the data of an already defined process, the editing operation of Menu No. 5 is initialized in its entirety.

Figure 6:
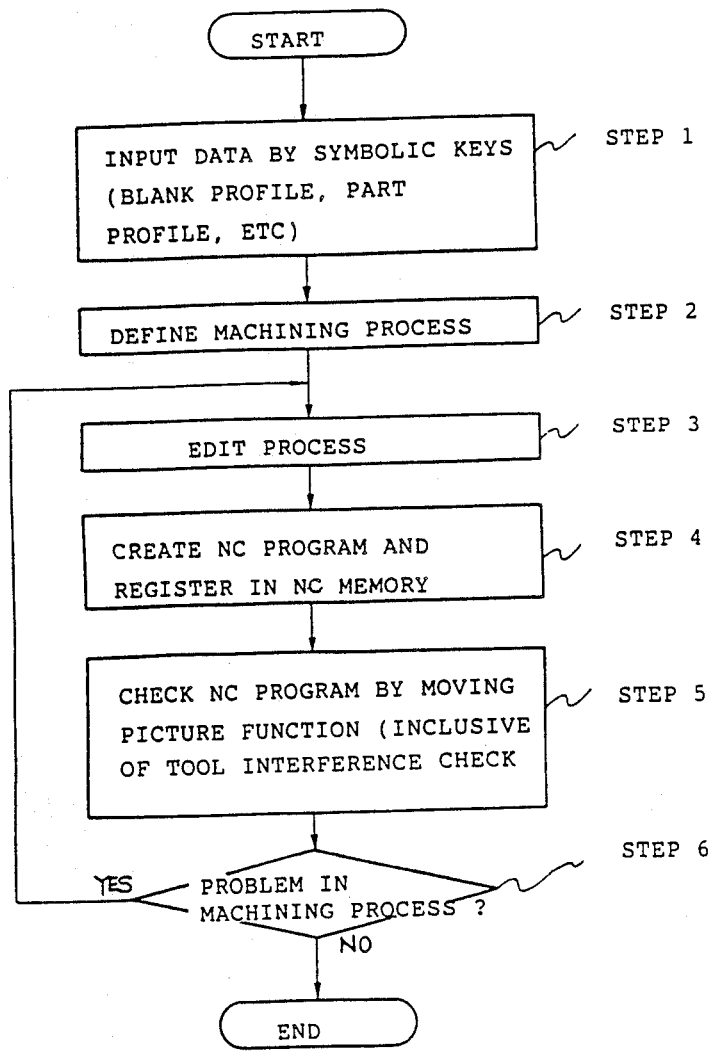
FIG. 6 is a flowchart illustrating a work flow for creating an NC program.

FIG. 6 is a flowchart illustrating an example of an operation for creating an NC program. First, the symbolic keys 19 (FIG. 2) are used to input a blank profile, part profile and the like in a conversational mode (step 1). The picture "Machining Definition" is called and the machining process is defined (step 2). Thereafter, machining process editing such as S code editing is performed at a step 3. All NC programs are created and registered in an NC memory (step 4). A moving picture is selected and a program check, such as a check for interference, is performed (step 5). It is determined whether there is a problem in a machining process based on the created program (step 6). If an alarm is issued at this time, the program returns to step 3 and editing of the process is done over again.

Thus, editing of the S (spindle function) code and editing of a process can be performed on the display screen by the process editing of step 3 and an M (miscellaneous function) code is outputted automatically for each tool rest, so that two NC programs in accordance with edited processes can be created efficiently even by a beginner.

Industrial Applicability

In accordance with the NC program editing method of the present invention, a menu picture reading "NC Data Creation" is displayed after a menu display reading "Machining Definition", a machining process which has already been defined is displayed according to tool rest on the initial picture reading "NC data Creation", editing of an S (spindle function) code and editing of a process are performed on this picture and an M (miscellaneous function) code is outputted automatically for each tool rest. As a result, two NC programs conforming to the processes inputted at the time of editing can be created and, by using the soft key functions of an MDI/CRT, modification of machining velocity, resetting of a machining sequence and the like can be performed with ease. This enables program editing to be performed efficiently even by a beginner.

We claim:

1. A method of editing NC programs for a four-axis lathe having two tool rests, comprising the steps of:

defining machining processes by deciding a machining sequence and a type of machining for each tool rest;

displaying defined processes together with predetermined NC data classified by tool rest;

resetting machining sequences of machining types capable of being performed simultaneously by both tool rests by positioning a cursor on a process to be moved and indicating, using a soft key corresponding to one of the tool rests, whether the process should be moved up or down; and modifying machining speed in said defining machining step.

2. A method of editing NC programs for a four-axis lathe according to claim 1, wherein modification of said machining speed is performed using soft keys of an MDI/CRT.

3. A method of editing NC programs for a four-axis lathe according to claim 1, wherein a miscellaneous function code is automatically inserted for each tool rest in NC programs for two tools rests based on said reset machining sequences.

* * * * *